(12) United States Patent
Axelsson et al.

(10) Patent No.: US 10,590,869 B2
(45) Date of Patent: Mar. 17, 2020

(54) ASSEMBLY AND METHOD FOR SAFE STARTING OF AN INTERNAL COMBUSTION ENGINE

(71) Applicant: HUSQVARNA AB, Huskvarna (SE)

(72) Inventors: Martin Axelsson, Hestra (SE); Björn Lundblad, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 3 days.

(21) Appl. No.: 15/538,058

(22) PCT Filed: Jun. 24, 2015

(86) PCT No.: PCT/SE2015/050736
§ 371 (c)(1),
(2) Date: Jun. 20, 2017

(87) PCT Pub. No.: WO2016/105258
PCT Pub. Date: Jun. 30, 2016

(65) Prior Publication Data
US 2018/0010531 A1    Jan. 11, 2018

Related U.S. Application Data

(60) Provisional application No. 62/096,014, filed on Dec. 23, 2014.

(51) Int. Cl.
*F02D 37/02* (2006.01)
*F02P 5/04* (2006.01)
(Continued)

(52) U.S. Cl.
CPC ........... *F02D 37/02* (2013.01); *F02D 31/009* (2013.01); *F02D 41/062* (2013.01); *F02P 5/045* (2013.01);
(Continued)

(58) Field of Classification Search
CPC ............. B27B 17/08; F02D 2200/0404; F02D 2200/101; F02D 31/009; F02D 37/02; F02P 5/045; F02P 5/1506
See application file for complete search history.

(56) References Cited

U.S. PATENT DOCUMENTS 3,498,280 A * 3/1970 West ........................ B27B 17/00
123/142.5 R
4,491,105 A    1/1985 Johansson
(Continued)

FOREIGN PATENT DOCUMENTS

CN    101761437 B    6/2011
DE    102009036372 A1    2/2011
(Continued)

OTHER PUBLICATIONS

International Search Report and Written Opinion for International Application No. PCT/SE2015/050736 dated Feb. 2, 2016.
(Continued)

*Primary Examiner* — Carl C Staubach
(74) *Attorney, Agent, or Firm* — Burr & Forman LLP

(57) ABSTRACT

An internal combustion engine for driving a working assembly with a clutch, including a combustion chamber into which a mixture of fuel and air is supplied, a spark plug to ignite the mixture, ignition of the mixture driving a piston operably coupled to a crank portion of the engine, a fuel supply system including a fuel valve and a throttle valve, a throttle position sensor configured to determine a position of the throttle valve, a speed sensor configured to determine engine speed, and an electronic control unit configured to control operation of the fuel valve and the spark plug, the electronic control unit being configured to initiate a speed limitation operation in response to a first position of the throttle valve at engine start-up, wherein the speed limitation
(Continued)

operation continues until the throttle valve is moved from its first position.

14 Claims, 7 Drawing Sheets

(51) Int. Cl.
  *F02P 5/15* (2006.01)
  *F02D 31/00* (2006.01)
  *F02D 41/06* (2006.01)
  *B27B 17/08* (2006.01)

(52) U.S. Cl.
  CPC ............. *F02P 5/1506* (2013.01); *B27B 17/08* (2013.01); *F02D 2200/0404* (2013.01); *F02D 2200/101* (2013.01); *F02D 2400/04* (2013.01); *F02D 2400/06* (2013.01); *Y02T 10/46* (2013.01)

(56) References Cited

U.S. PATENT DOCUMENTS

| | | | |
|---|---|---|---|
| 4,553,517 A | 11/1985 | Andreasson | |
| 4,610,231 A | 9/1986 | Nakata et al. | |
| 4,630,590 A | 12/1986 | Kondo et al. | |
| 4,633,832 A | 1/1987 | Andreasson et al. | |
| 4,928,458 A | 5/1990 | Muroya et al. | |
| 4,979,477 A | 12/1990 | Nickel et al. | |
| 5,050,553 A | 9/1991 | Erhard | |
| 5,447,131 A | 9/1995 | Nickel et al. | |
| 5,551,395 A | 9/1996 | Isaacs et al. | |
| 5,619,967 A * | 4/1997 | Streib ................... | F02D 11/105 123/399 |
| 6,408,820 B1 | 6/2002 | LaMarr, Jr. | |
| 6,446,600 B1 * | 9/2002 | Scherer ................... | F02D 11/10 123/399 |
| 6,508,230 B2 | 1/2003 | Sugano | |
| 7,171,942 B2 | 2/2007 | Nickel | |
| 7,381,009 B2 | 6/2008 | Jenkins et al. | |
| 7,644,781 B2 | 1/2010 | Moriyama et al. | |
| 7,699,039 B2 | 4/2010 | Carlsson et al. | |
| 7,735,471 B2 | 6/2010 | Andersson et al. | |
| 8,257,227 B2 | 9/2012 | Brand et al. | |
| 8,469,001 B2 | 6/2013 | Yoshizaki et al. | |
| 2006/0086337 A1 | 4/2006 | Nickel | |
| 2009/0193668 A1 | 8/2009 | Gorenflo | |
| 2010/0147544 A1 * | 6/2010 | Yoshizaki ............... | F02D 11/04 173/176 |
| 2011/0095215 A1 | 4/2011 | Larsson et al. | |
| 2012/0193112 A1 * | 8/2012 | Gwosdz ................ | F02D 31/009 173/1 |
| 2012/0297631 A1 | 11/2012 | Kunert et al. | |
| 2013/0151126 A1 | 6/2013 | Harrer et al. | |
| 2013/0199812 A1 | 8/2013 | Dangelmaier et al. | |
| 2014/0000543 A1 | 1/2014 | Karrar | |
| 2014/0034011 A1 | 2/2014 | Gegg et al. | |
| 2014/0165964 A1 * | 6/2014 | Leufen .................. | F02P 5/1502 123/406.19 |
| 2014/0166323 A1 | 6/2014 | Cooper | |
| 2014/0208709 A1 | 7/2014 | Helin et al. | |
| 2014/0230787 A1 | 8/2014 | Mezaki et al. | |
| 2014/0299095 A1 | 10/2014 | Arai et al. | |

FOREIGN PATENT DOCUMENTS

| | | |
|---|---|---|
| EP | 0173766 A2 | 3/1986 |
| EP | 1995027 B1 | 9/2010 |
| JP | 3945612 B2 | 7/2007 |
| WO | 2009085006 A1 | 7/2009 |
| WO | 2014002951 A1 | 1/2014 |
| WO | 2014038998 A1 | 3/2014 |
| WO | 2014096225 A1 | 6/2014 |

OTHER PUBLICATIONS

International Preliminary Report on Patentability for International Application No. PCT/SE2015/050736 dated Jun. 27, 2017.

* cited by examiner

ASSEMBLY AND METHOD FOR SAFE STARTING OF AN INTERNAL COMBUSTION ENGINE

TECHNICAL FIELD

Example embodiments generally relate to internal combustion engines and, more particularly, relate to a method and assembly for limiting the speed of the engines below a clutch-in speed of a corresponding clutch under start-up conditions.

BACKGROUND

Multi-purpose portable working devices such as, but not limited to, chain saws, cutting tools and grass trimmers having internal combustion engines are well known. Each of these types of devices has a working assembly, such as a chain or cutting blade, which is brought to an operating rotational speed by the included engine. Since the working assembly is often close-by the operator, there is a risk of contact and an accidental injury occurring. Therefore, such devices are often equipped with a mechanical security brake for the assembly, together with other security arrangements such as requiring active hand-grip engagement by the operator in order to affect operation.

These types of devices are normally equipped with a centrifugal clutch that engages the working assembly when the engine exceeds a certain rotational speed, or clutch-in speed. In normal operation, the clutch improves safety because the tool does not rotate when the engine speed is reduced below the clutch-in speed. The risk for bodily injury is therefore significantly reduced.

These devices are typically started with the throttle valve positioned in a starting position in order to ensure an efficient start-up, this is sometimes referred to as fast idle. Because of the valve position, more air flows into the engine causing the engine rotational speed to immediately increase above the clutch-in speed at which the clutch engages the working assembly. This can present a risk because the operator will not always follow the operator's manual and ignore safety precautions and thus not engage the mechanical brake (or other security arrangements providing the intended protection) at start of the engine. Still further, as the engine speed quickly rises upon starting, the clutch-in speed will be achieved before the operator is ready for the working assembly (for example, a chain blade) to begin operation.

SUMMARY

Some example embodiments may provide for limiting engine speed during start-up operations of a corresponding device to avoid inadvertent activation of the associated working assembly, such as engine-driven rotating cutting equipment. In this regard, for example, some embodiments may provide for skipping or limiting the ignition sparks or the fuel supplied to the engine on start-up, especially when the revolution speed of the engine is higher than a threshold level. This limiting function is then deactivated as a deliberate action is taken on the part of the operator.

In one example embodiment, an internal combustion engine is provided. The internal combustion engine may include a combustion chamber into which a mixture of fuel and air is supplied, a spark plug disposed proximate to the combustion chamber to ignite the mixture by generating a spark, ignition of the mixture driving a piston operably coupled to a crank portion of the engine, a fuel supply system including a fuel valve and the throttle valve, the fuel valve being alternately opened or closed to control fuel provision into the mixture and the throttle valve being adjustable to control the provision of air into the mixture, a throttle position sensor configured to determine a position of the throttle valve, a speed sensor configured to determine engine speed, and an electronic control unit configured to control operation of the fuel valve and the spark plug. The electronic control unit may be configured to initiate a speed limitation operation in response to a first position of the throttle valve as determined by the throttle valve position sensor at engine start-up, and the speed limitation operation maintains the engine speed below a predetermined speed until the throttle valve is moved from its first position.

In another example embodiment, a hand-held, combustion engine driven power tool, such as a chainsaw, is provided. The power tool may include a working assembly configured to perform a cutting operation and an internal combustion engine operably coupled to the working assembly by a clutch to power the working assembly. The internal combustion engine may include a combustion chamber into which a mixture of fuel and air is supplied, a spark plug disposed proximate to the combustion chamber to ignite the mixture by generating a spark, ignition of the mixture driving a piston operably coupled to a crank portion of the engine, a fuel supply system including a fuel valve and the throttle valve, the fuel valve being alternately opened or closed to control fuel provision into the mixture and the throttle valve being adjustable to control the provision of air into the mixture, a throttle position sensor configured to determine a position of the throttle valve, a speed sensor configured to determine engine speed, and an electronic control unit configured to control operation of the fuel valve and the spark plug. The electronic control unit may be configured to initiate a speed limitation operation in response to a first position of the throttle valve as determined by the throttle valve position sensor at engine start-up, and the speed limitation operation maintains the engine speed below a predetermined speed until the throttle valve is moved from its first position.

In another example embodiment, a method of controlling an internal combustion engine is provided. The method may include determining a first position of the throttle valve within an operating range of the throttle valve at start-up of the engine, initiating a speed limitation operation at start-up of the engine dependent upon the first position of the throttle valve, monitoring engine speed, monitoring the position of the throttle valve within the operating range, and maintaining the speed of the engine below a predetermined speed until the throttle valve is moved from the first position.

The inventors of this patent application have, after careful and insightful reasoning, realized that by utilizing the throttle sensor normally used to provide an angle reading to map the amount of fuel to be provided to the current revolution speed and the current throttle level, and to realize to combine this with ignition control, one can control and limit the revolution speed of an engine to not exceed a certain speed where a working tool starts to rotate. Thus one is able to provide a start safety mechanism that only utilizes already present parts of an engine and without requiring a complicated clutch assembly. This manner is further very simple for an operator to control The teachings herein thus carry great benefit in that it is a cheap and easy to implement.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3A:
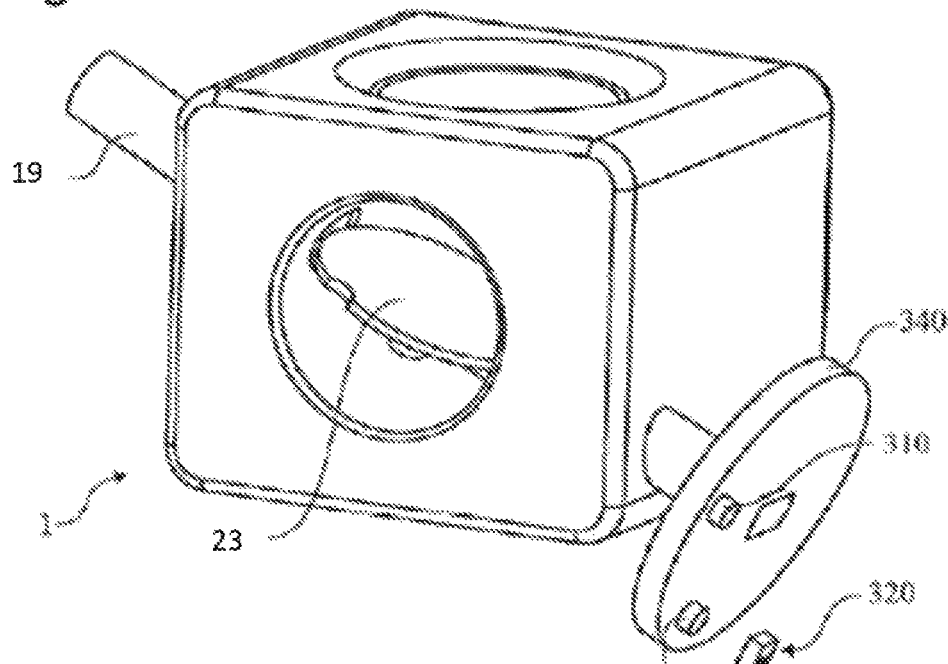
Figure 3B:
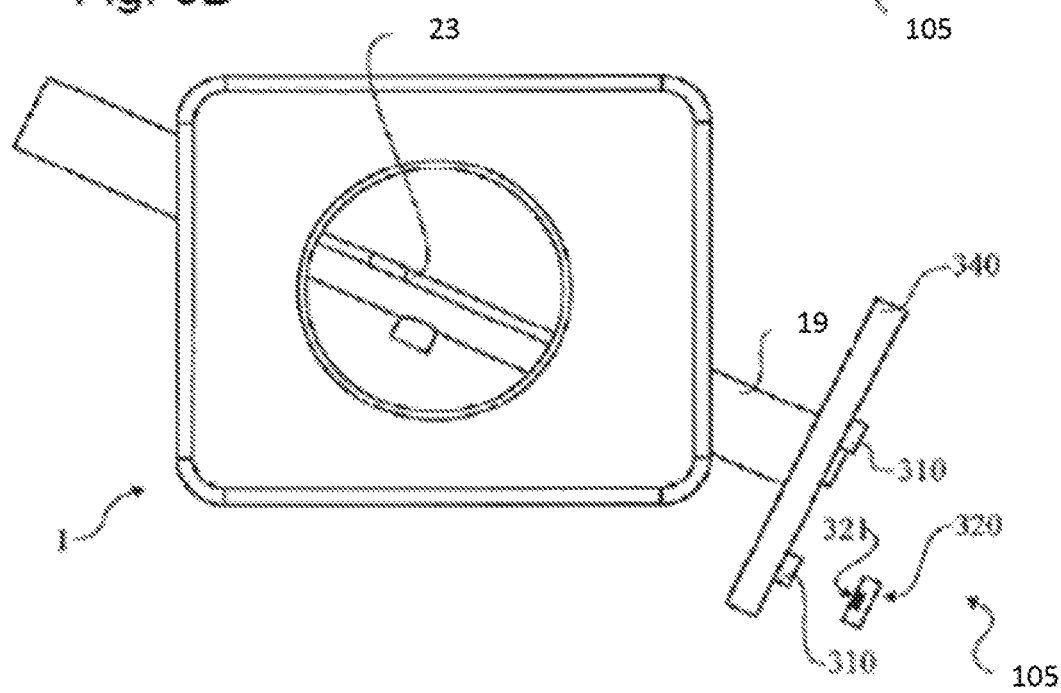
Figure 4:
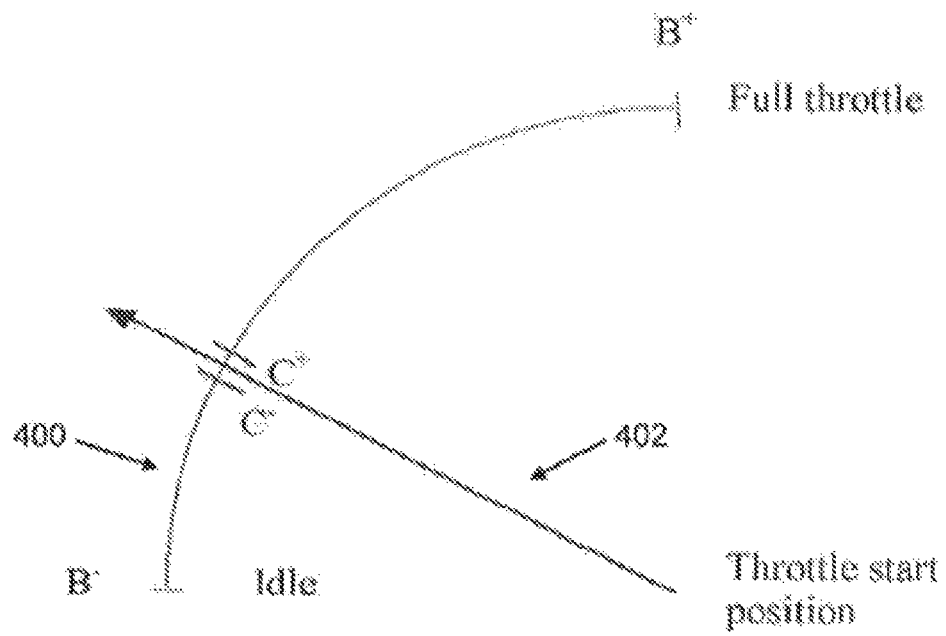
Figure 5:
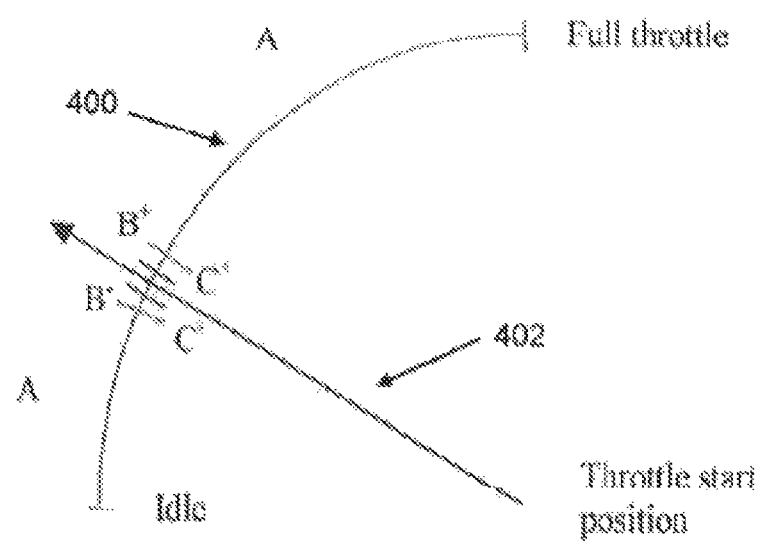
Figure 6:
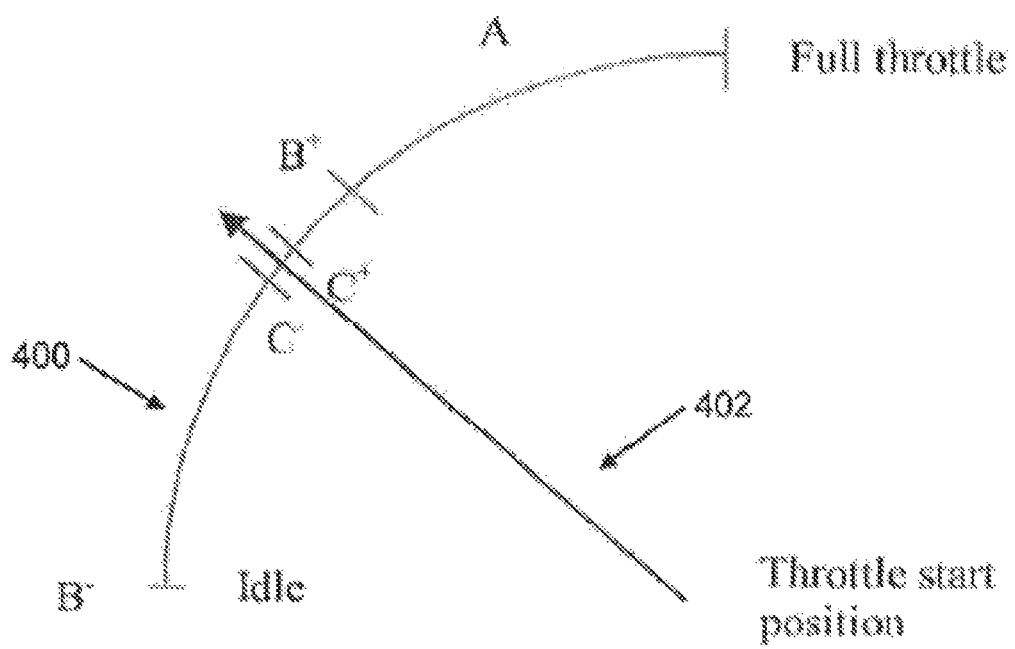
Figure 7:
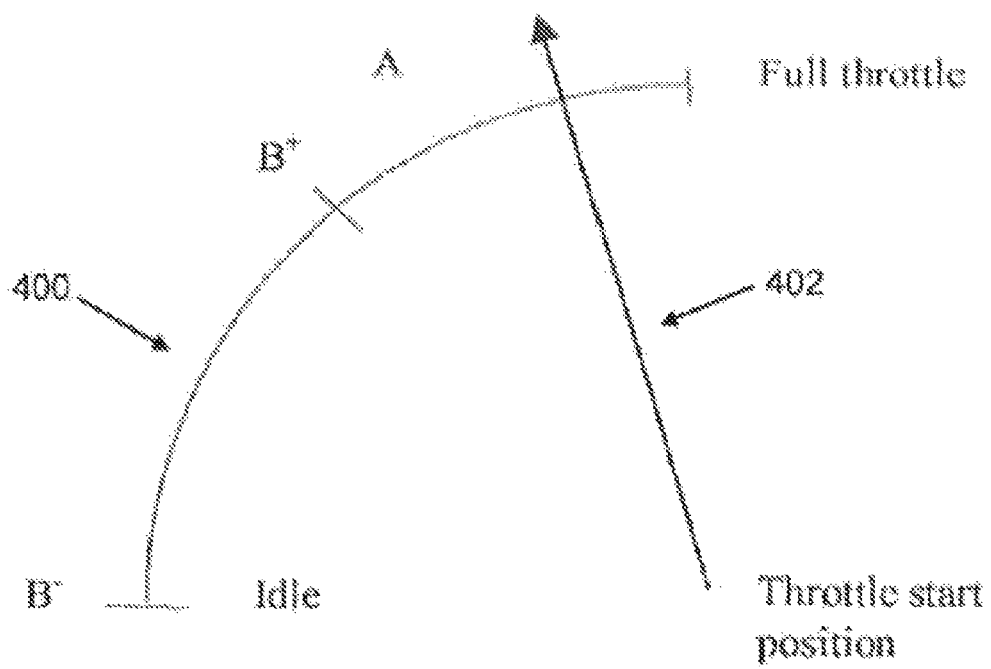
Figure 8:
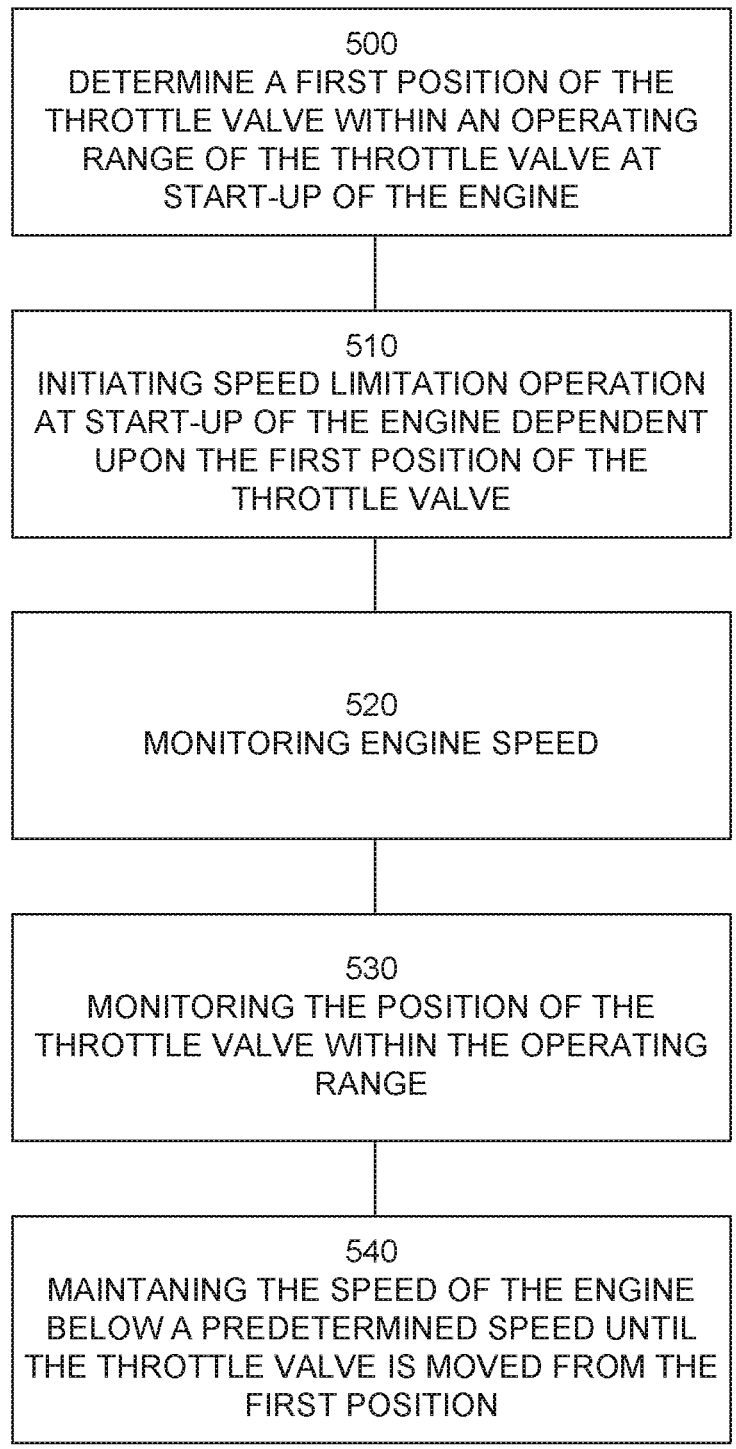

FIG. 3, which includes FIGS. 3A and 3B, illustrates a perspective view and a side view, respectively, of a throttle position sensor according to an example embodiment;

FIG. 4 illustrates a start-up mode range for a throttle in accordance with an example embodiment;

FIG. 5 illustrates a start-up mode range for a throttle in accordance with an example embodiment;

FIG. 6 illustrates a start-up mode range for a throttle in accordance with an example embodiment;

FIG. 7 illustrates a start-up mode range for a throttle in accordance with an example embodiment; and FIG. 8 illustrates a method of controlling an internal combustion engine according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may provide for an internal combustion engine that employs a controller for limiting the speed of the engine on a start-up below the clutch-in speed of a centrifugal clutch that drives a working assembly. It should be appreciated that although an example embodiment will be shown and described illustrating a crank case scavenged internal combustion engine that may be used in connection with a hand held chainsaw being an example of a handheld power tool, example embodiments could be practiced in connection with engines for other similar devices such as hedge cutters, power cutters, pole saws, hedge trimmers, trimmers, brush cutters, and/or other handheld power tools.

Figure 1A:
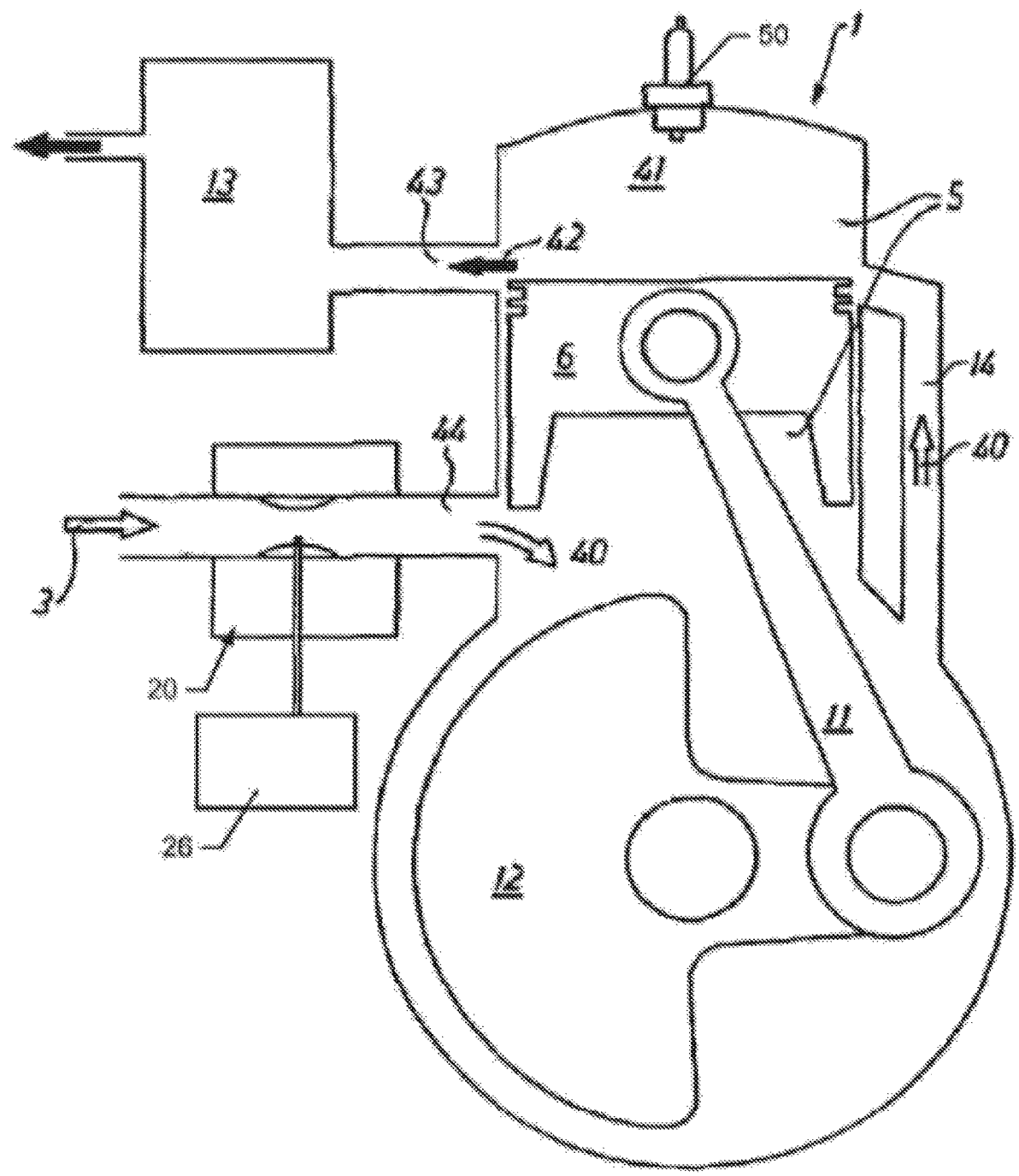
FIG. 1A illustrates a schematic view of an internal combustion engine according to an example embodiment.

FIG. 1A illustrates a schematic view of a two-stroke internal combustion engine 1. However, example embodiments could also be practiced in connection with internal combustion engines of different types (e.g., four-stroke internal combustion engines). The engine 1 of FIG. 1 is crank case scavenged in which, for example, a mixture 40 of air 3 and fuel from a fuel supply system 20 (e.g., a carburetor or low pressure fuel injection system) is drawn to the engine crank house. From the crank house, the mixture 40 is carried through one or several scavenging passages 14 up to an engine combustion chamber 41. The engine combustion chamber 41 is provided with a spark plug 50 that ignites the compressed air-fuel mixture. Exhaust 42 may exit through an exhaust port 43 and through a silencer 13.

The engine 1 may also include a piston 6 that is attached to a crank portion 12 equipped with a counter weight via a connecting rod 11. In FIG. 1A, the piston 6 assumes an intermediate position in which flow is possible both through the intake port 44, the exhaust port 43 and through the scavenging passage 14. The mouth of intake passage 21 into the cylinder 5 may be referred to as the intake port 44. Accordingly, the intake passage 21 may be closed by the piston 6. By opening and closing the intake passage 21, varying flow speeds and pressures may be created inside the passage. These variations largely affect the amount of fuel supplied when the fuel supply system 20 is a carburetor. Since a carburetor has an insignificant fuel feed pressure, the amount of its fuel feed is entirely affected by pressure changes in the intake passage 21. The supplied amounts of fuel may be considered to be affected by the varying flow speeds and pressures inside the intake passage 21 based on opening and closing of the intake passage 21. Since the crank case in crank case scavenged two-stroke engines or crank case scavenged four-stroke engines can hold a considerable amount of fuel and consequently serve as a leveling reservoir, it is not necessary to adjust the fuel supply for each revolution. Instead, adjustment of fuel supply in one revolution may affect subsequent revolutions.

Figure 1B:
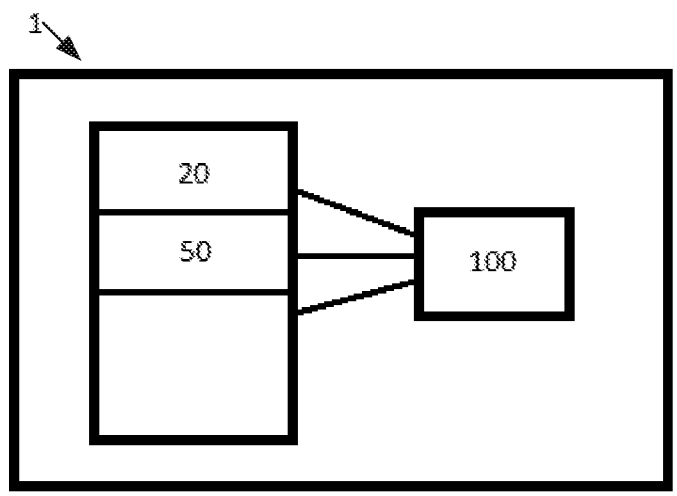
FIG. 1B illustrates a schematic view of an internal combustion engine according to an example embodiment

FIG. 1B shows a schematic block diagram view of an engine 1, such as the engine of FIG. 1A. The engine 1 comprises a controller 100 for controlling the operation of the engine 1. The controller is connected to various components of the engine 1, such as the fuel supply system 20, and/or a spark ignition 50 and/or other various components. The controller 100 may comprise one or more electronic control units (ECU), possibly arranged to control one or several components each. In this manner, which is known to a person skilled in engines, the control of the engine 1 may be distributed locally. In the text below there will be made no differentiation whether the operation is controlled by a central processor or a distributed processor, possibly in co-operation with another distributed processor. For example, a method according to herein may be implemented and performed partially by a first electronic control unit, and also be implemented and performed partially by a second electronic control unit, wherein the first and second electronic control units complement each other and are both considered to be part of the same controller. For example, the controller 100 may comprise one ECU for controlling the fuel supply system 20 and another ECU for controlling the spark ignition system 50, alternatively the controller 100 may comprise one ECU for controlling both the fuel supply system 20 and the spark ignition system 50. Alternatively or additionally, the controller may comprise one ECU for controlling both the fuel supply system 20 and the spark ignition system 50 wherein one ECU receives commands or data from the other ECU. Many combinations exist, as would be clear to a skilled person, and further details will not be given herein and the various ECUs will be commonly referred to as the controller 100. Also, other ECUs may be utilized for example for monitoring the engine revolution speed. The controller is thus arranged to monitor and/or control the engine revolution speed, the fuel supply system and the ignition module or system.

The one or more controllers 100 will hereafter be referred to as one and the same controller 100 making no differentiation of which processor is executing which operation. It should be noted that the execution of a task may be divided between the controllers wherein the controllers will exchange data and/or commands to execute the task. For example, if one processor monitors the engine revolution speed, such as an ignition system electronic unit (referenced 100B in FIG. 1D below), and forwards data on this to a processor regulating the fuel supply system, such as a fuel supply system electronic unit (referenced 100A in FIG. 1D below), these processor actions will be referred to as having been made by the controller 100, the controller 100 thus comprising both the processor monitoring the engine revolution speed and the processor regulating the fuel supply system.

Figure 1C:
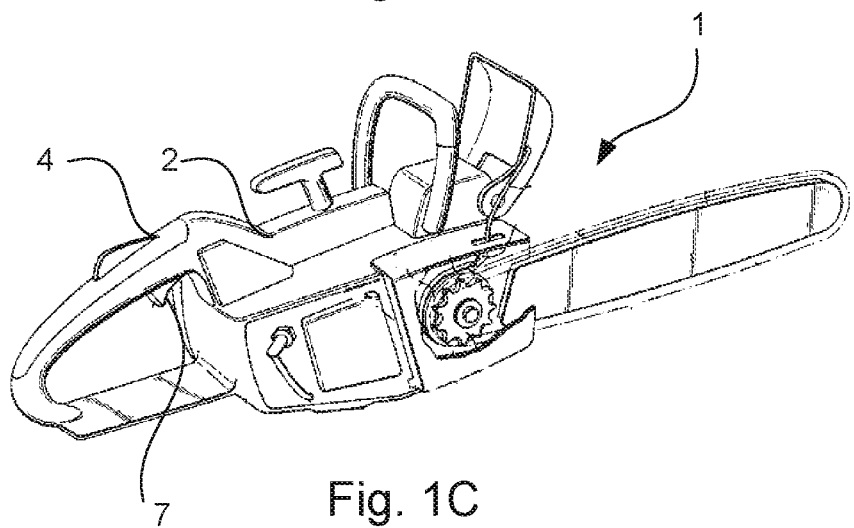
FIG. 1C illustrates a schematic view of a hand-held power tool having an internal combustion engine according to an example embodiment.
Figure 1D:
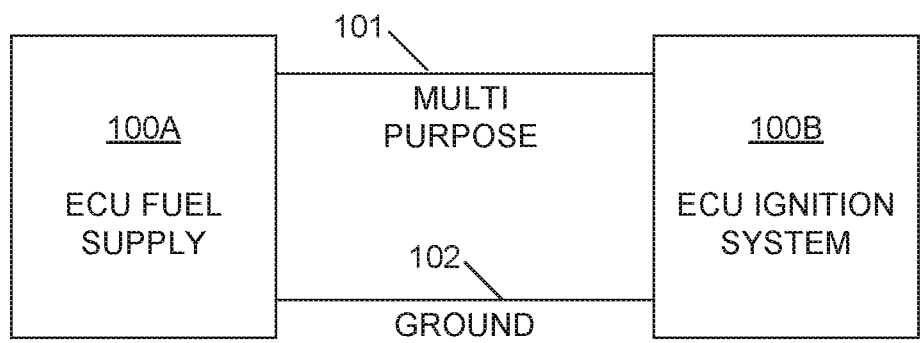
FIG. 1D illustrates a schematic view of a control unit arrangement according to an example embodiment.

However this having been said, FIG. 1D shows an example of how a fuel supply electronic control unit (ECU) 100A may be connected to an ignition system electronic control unit 100B. As can be seen the fuel supply ECU 100A is connected to the ignition system ECU 100B through two wires, a ground wire 102 and a multi purpose communication wire 101. The multi purpose communication wire 101 may be used to relay the current revolution speed to the fuel supply system for regulating the fuel supply possibly including a revolution limiting function as disclosed herein based on the revolution speed. The multi purpose communication wire 101 may also or alternatively be used to relay the throttle angle to the fuel supply system for regulating the ignition possibly including a revolution limiting function as disclosed herein based on the throttle angle. FIG. 1C shows a hand-held power tool comprising an internal combustion engine as in FIGS. 1A and 1B. In this example the power-tool is exemplified as a chainsaw, but the teachings herein may also be used with other power tools, such as hedge cutters, pole saws, trimmers and brush cutters to name a few. The power tool 2 comprises an internal engine 1 (not visible as it is internal) and a handle 4, on which a throttle trigger 7 is arranged. The throttle trigger is effectively coupled to a throttle valve (referenced 23 in FIG. 2) of the fuel supply system in such a way that as the throttle trigger 7 is pushed or pulled, the throttle valve (referenced 23 in FIG. 2) changes its angle.

Figure 2:
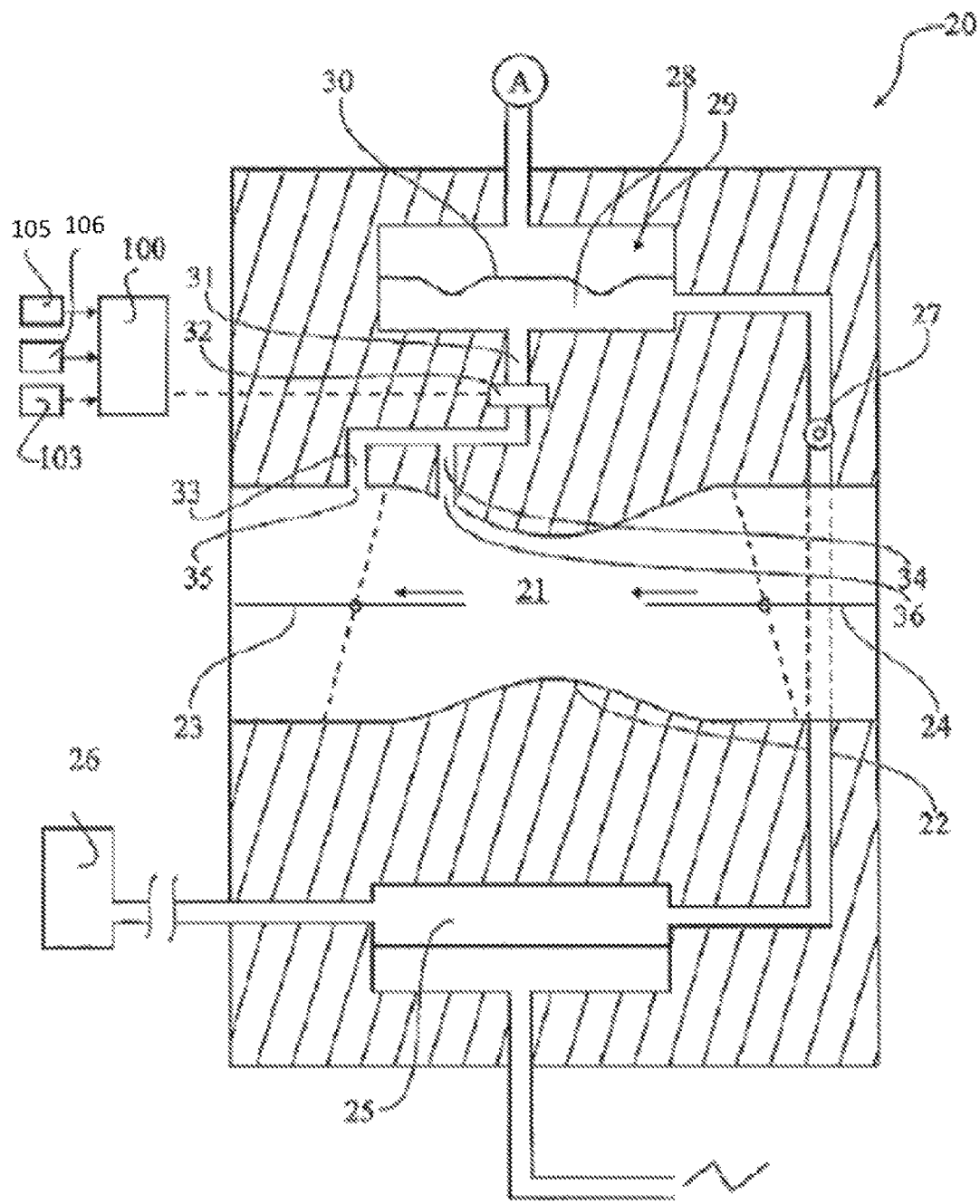
FIG. 2 illustrates a carburetor type fuel supply system in accordance with an example embodiment.

FIG. 2 illustrates a carburetor type fuel supply system 20 in accordance with an example embodiment. As shown in FIG. 2, the carburetor of the fuel supply system 20 includes the intake passage 21 having a venturi 22. A throttle valve 23 is rotatably supported or a throttle shaft 19 in the intake passage 21, along with a choke valve 24. The carburetor of the fuel supply system 20 also includes a fuel pump 25, which draws fuel from a fuel tank 26. The fuel pump 25 may be a pulsation controlled diaphragm pump, which could be driven by pressure pulses generated by a crank case of the engine 1 of FIG. 1. The fuel pump 25 delivers fuel, via a needle valve 27, to a fuel metering chamber 28 of a fuel regulator 29.

The fuel metering chamber 28 may be separated from atmospheric pressure by a diaphragm 30 and may be configured to hold a predetermined amount of fuel. A duct 31 from fuel metering chamber 28 may lead to a fuel valve 32. The fuel valve 32 may be a bistable valve, operating between open and closed positions. The fuel valve 32 may open or close the interconnection between the fuel metering chamber 28 and the fuel lines (33 and 34), leading to the intake passage 21. The fuel valve 32 may be a continuous or variable valve, operating between open and closed positions and also intermediate positions. The fuel valve is thus arranged to control the fuel supply. A finer channel 33 among the fuel lines may lead to an idle nozzle 35 downstream of the throttle valve 23. Due to the varying pressures in the intake passage 21 as the engine operates, fuel is drawn from the fuel metering chamber 28 through the main nozzle 36 and the idle nozzle 35. When the fuel valve 32 is closed, fuel is prevented from being drawn from the fuel metering chamber 28. When the throttle valve 23 is closed, fuel is drawn from the idling nozzle 35 and the main nozzle 36. However, since the coarser fuel line 34 to the main nozzle 36 is substantially larger than the finer fuel line 33 to the idling nozzle 35, the idling nozzle 35 may only have small effects on the fuel supply during full throttle operation.

The fuel valve 32, which may in some cases be solenoid operated, may be controlled by the controller 100. The controller 100 may also control operation of the spark plug 50 for the application of spark to ignite the mixture 40 in the combustion chamber 41. As such, in some embodiments, the controller 100 may be an ignition control device. Controller 100 may receive sensor inputs such as, for example, throttle position from a throttle position sensor 105 (or sensors), engine speed data from an engine speed sensor 106 (or sensors), and/or inputs from an additional sensor 103 (or sensors). The additional sensor 103 could be a temperature sensor or any other suitable parameter measurement sensor. The controller 100 may use the sensor inputs to control the A/F ratio by deciding when to open or close the fuel valve 32 and/or to control the timing of application of spark for ignition of the mixture 40 in the combustion chamber 41. In this capacity, the controller 100 may be used to limit engine speed at start-up to prevent inadvertent operation of the working assembly, as discussed in greater detail below. In an alternate embodiment, the controller 100 may function as a control module including engine management logic that communicates with an independent ignition module that controls the application of spark to the mixture 40 and ignition timing. The ignition module, whether a component of the controller 100 or independent of the ECU, has at least two modes of ignition, a start-up mode and normal mode, as discussed in great detail below.

In the normal mode, the throttle valve, which is arranged to provide it's current operating angle or position (i.e. how much it is opened) to the controller as will be disclosed below with reference to FIG. 3, is primarily used to determine a proper fuel supply.

However, in the start-up mode, which is at the heart of this application, the throttle position is also used to determine whether a conscious and willful increase of the revolution speed, such as through operation of the throttle, is being effected or not. This is used to enable the controller to maintain the revolution speed of the engine under or around a predetermined threshold value, to prevent the engine from racing unintentionally and thereby preventing the power tool from unintentionally start operating, which in the example of a chain saw means that the chain will be prevented from moving, at least at any speed at which the chain saw would be effective as a cutting tool.

The throttle position is sensed by the throttle position sensor and provided to the controller (which may be comprised of several electronic control units as discussed above), and if it is sensed that the throttle is moved to a position outside either a first area (C+/C−) or a second area (B+/B−), the controller will determine that a willful activation of the throttle has taken place and will thereafter operate in the normal mode. The first area (C+/C−) may be determined upon startup as an area around the current throttle position. Moving the throttle position outside this area indicates that the throttle is being moved intentionally. In one embodiment the first area may be 5 percent of the full range of operation for the valve. In one embodiment the first area may be in the range 3 to 12 percent of the full range of operation for the valve. In one embodiment the first area may be in the range 3 to 30 percent of the full range of operation for the valve. In one embodiment the relative size of the area in relation to the full range of operation is regarded as being the movement in one direction (that is C=5%, 3-12%, 3-30% and/or C-=-5%, -3--12%, -3--30%). In one embodiment the relative size of the area in relation to the full range of operation is regarded as being the movement in both directions (that is C+C-=5%, 3-12%, 3-30%). The second area (B+/B-) may be set by designers and indicates a throttle position area inside which the start-up mode should be initiated. By starting the power tool engine in a throttle position outside this second area, a user may indicate that he is intending on using the power tool imminently and no startup mode is necessary. As such, the controller will not activate the start-up mode, but start directly in the normal mode.

The throttle position sensor (being a known entity in combustion engines) is thus utilized for two purposes, both for determining a proper fuel supply, and for determining that a revolution speed increase is intentional on behalf of the user.

In one embodiment, the controller may also be configured to determine that the throttle position is outside either or both of the first and second areas, before deactivating the start-up mode and operating according to the normal mode. This ensures that the throttle activation was intentionally and protects against short unintentional activations of the throttle activating the tool.

Further details on the invention in general, and about these embodiments in particular, will be given in detail in the below.

Engine speed data may be obtained via any of a number of different ways. For example, a flywheel that rotates with the same speed as the engine crank may have one or more magnets provided on its periphery. The magnets can be used to provide energy to the ignition system as well as to other electronic components such as the controller 100, but may also be used for monitoring the engine speed by having the engine speed sensor 106 comprising a stationary detection unit arranged to detect each time the magnet (or magnets) of the flywheel pass the detection unit. The accuracy of the engine speed sensor 106 may be dependent upon the number of magnets on the flywheel and the number of detection units. For example, by using one magnet and one detection unit, the time it takes for a full rotation can be measured, and by using two magnets and one detection unit, the time it takes for a half rotation of the flywheel can be measured. If engine speed is to be measured more frequently, the number of magnets and/or the detection units can be increased. Alternatively or additionally, other methods of providing engine speed data may be employed within the spirit and scope of example embodiments. The controller is thus configured to receive a sensor reading indicating the revolution speed.

Throttle position data is preferably obtained via the throttle position sensor 105 shown in FIG. 3, which includes FIGS. 3A and 3B, showing perspective and side views, respectively. Magnetic sensing element 320 is an analogous hall device that is mounted in a fixed manner to a stationary portion of the fuel supply system 20. The analogous hall device 320 has a hall element 321 which is configured to generate an output voltage that is proportional to the magnetic flux density through the hall element 321. The analogous hall device 320 can have an integrated circuit for compensating for different conditions, such as temperature changes. A movable portion 340 has a substantially disc-like shape and is attached to the throttle shaft 19 at its center and has two magnets 310 being polarized in a direction preferably perpendicular to the fixed portion. However, the movable portion 340 can of course be configured differently, e.g. having a triangular shape, or being provided with only one magnet 310 or more than two magnets 310. The magnets 310 are secured to the movable portion 340 at a distance from the axis of rotation and the magnets 310 are separated by approximately 75°. Further, the two magnets 310 are polarized in opposite direction in relation to each other, so as to form a magnetic flux density through the hall element 321 of the hall effect device 320 that is substantially proportional to the size of rotation of the movable portion 340 and the throttle shaft 19. Consequently, the analogous hall sensor 320 generates an output voltage being approximately linear in relation to size of rotation of the throttle shaft 19 and the throttle valve 23. With this kind of hall effect device 320, an accurate value of the position of the throttle valve 23 within the operating range of the throttle valve 23 can be determined. The throttle position data may thus comprise either such an output voltage based on which the position of the throttle valve can be determined, an intermediate result based on which the position of the throttle valve can be determined or the determined position of the throttle valve.

In some embodiments, an engine speed limitation operation may be applied by altering the ignition timing of the engine. Altering the ignition timing may be utilized either alone or in combination with skipping ignition of the engine when the engine is initially started and when the engine revolution speed exceeds a threshold, dependent upon the position of the throttle valve 23 within its operating range at the start-up of the engine 1. For example, limiting the engine's speed below the clutch-in speed of the clutch that drives a device's working assembly may be accomplished by limiting such as by skipping ignition or timing of ignition spark. Alternatively, the fuel supply may be controlled during start-up operations by closing the fuel valve 32 (e.g., shutting off the fuel supply) during a number (Ns) of evenly distributed revolutions. For example, the fuel valve 32 may be closed during the entire intake cycle for the revolutions for which it is closed, and may be fully open during the entire intake cycle for revolutions for which it is open. Detailed descriptions of limiting ignition and controlling fuel supply as a means of limiting the speed of an engine are provided in WO 2009/116902, which is incorporated herein in its entirety and, as such, are not repeated here. Limitation of the engine's speed by way of the noted methods is preferably maintained until a deliberate act such as, but not limited to, manipulation of the throttle valve is taken by the operator of the device which indicates that he intends for the working assembly to be activated.

Referring now to FIG. 4, a graphical representation of an example embodiment of controlling the engine 1 is shown. Specifically, curved line 400 represents the full operating range of the throttle valve 23, and arrow 402 represents the position of the throttle valve 23 within that range. The range indicated by $B^-/B^+$ is the range of start-up throttle valve positions for which the controller 100 will initiate a speed limitation operation, thereby maintaining the speed of the engine 1 below the clutch-in speed at which the engine 1 engages the corresponding working assembly. As shown, the range B⁻/B⁺ has been selected so that the controller 100 initiates a speed limitation operation for all possible start-up positions of the throttle valve 23. Additionally, the range indicated by C⁻/C⁺ represents the amount to which the throttle valve 23 must be moved in either the opening or closing directions before the controller 100 will cease the speed limitation operation on the engine so that normal operations may continue. Preferably, the range C⁻/C⁺ is selected to be large enough that only a deliberate repositioning of the throttle valve 23 by the operator will terminate the speed limitation operation, thereby preventing inadvertent engagement of the working assembly by the engine 1. Range C⁻/C⁺ can be selected to be the same angle range regardless of the start-up position 402 of the throttle valve 23. Alternatively, the angle range C⁻/C⁺ can depend upon the particular start-up position of the throttle valve 23 within range B⁻/B⁺. The angle range C⁻/C⁺ may be set with respect to the extent or size as well or alternatively with respect to the position based on the particular start-up position.

Referring now to FIG. 5, a graphical representation of an alternate example embodiment of controlling the engine 1 is shown. As with the previously discussed embodiment, the range indicated by B⁻/B⁺ is the range of start-up throttle valve positions for which the controller 100 will initiate a speed limitation operation, thereby maintaining the speed of the engine 1 below the clutch-in speed at which the engine 1 engages the corresponding working assembly. As shown, the range B⁻/B⁺ has been selected to include only a small portion of the full operating range 400 of the throttle valve 23, leaving two portions of the operating range, indicated by A, outside of range B⁻/B⁺. For start-up throttle valve positions that fall within range portions A, the speed limit operation is deactivated directly from the start-up of the engine. Note, however, for those instances in which the start-up throttle valve position 402 falls within the range B⁻/B⁺, the range indicated by C⁻/C⁺ is again provided to indicate the amount to which the throttle valve 23 must be moved in either the opening or closing directions before the controller 100 will cease the speed limitation operation on the engine. The C⁻/C⁺ range may be set to be static upon startup or dynamic and change as the throttle valve position falls within the B⁻/B⁺ range.

Referring now to FIGS. 6 and 7, yet another graphical representation of an alternate embodiment of controlling the engine 1 is shown. As with the embodiment shown in FIG. 5, the present embodiment includes a range of start-up throttle valve positions, indicated by range B⁻/B⁺, for which the controller 100 initiates a speed limitation operation on the engine 1. However, because range B⁻/B⁺ extends all the way to the idle position of the throttle valve 23, only one range exists, indicated by A, for which the speed limitation operation by the controller 100 is deactivated directly from start-up. Once again, for those instances in which the start-up throttle valve position 402 falls within range B⁻/B⁺ (FIG. 6), range C⁻/C⁺ is provided so that the speed limitation operation is terminated after the throttle valve 23 is moved the predetermined distance. Note, where the start-up throttle valve position 402 falls within range A (FIG. 7), range C⁻/C⁺ is not necessary as the speed limit operation is deactivated at start-up.

FIG. 8 illustrates a block diagram of a method of controlling an internal combustion engine. The method may include determining a first position of the throttle valve within an operating range of the throttle valve at start-up of the engine 500, initiating a speed limitation operation at start-up of the engine dependent upon the first position of the throttle valve 510, monitoring engine speed 520, monitoring the position of the throttle valve within the operating range 530, and maintaining the speed of the engine below a predetermined speed until the throttle valve is moved from the first position 540.

To summarize, if a power tool is started when the throttle valve is in an opened position which is such that not only does it provide for a fast idle, it will also provide for an engine revolution speed that will continue to grow, at least above a threshold. As the engine speed exceeds above the threshold, the functionality of the teachings herein will be activated and limit the engine revolution speed, by changing the timing of the ignition or skipping at least some ignition sparks completely. The engine will then reduce its revolution speed (significantly) and the engine revolution speed will fall below the threshold thus maintaining a safe operation.

One benefit of controlling the ignition module is that it provides for a precise control that is easy to implement for a wide range of engines, that does not need to be calibrated and that does not risk causing an (unnecessary) increase in exhaust fumes.

In the above disclosure focus has been given on controlling the ignition by limiting the number of sparks, that is to skip one or more sparks.

The number of sparks that should be skipped may be based on the amount that the revolution speed exceeds the threshold values. The controller will thus be configured to skip a number of sparks based on the difference between the current revolution speed and the threshold value, so that an increase in revolution speed leads to an increase in number of sparks skipped.

Alternatively (or additionally) the controller may be configured to control the ignition by changing the ignition timing. For example, to reduce the speed of the engine, the timing may be moved so that it happens earlier in a revolution cycle. The chamber will then not have received as much fuel, and the fuel has not yet been compressed. The result is that the engine provides less power on that ignition than it would if the timing had been correct.

The controller is thus configured to limit the revolution speed by adapting the timing of the ignition.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. An internal combustion engine arranged to be used with a power tool and for driving a working assembly of said power tool, said working assembly having a clutch, said engine comprising:
   a combustion chamber into which a mixture of fuel and air is supplied;
   a spark plug disposed proximate to the combustion chamber to ignite the mixture by generating a spark, ignition of the mixture driving a piston operably coupled to a crank portion of the engine;
   a fuel supply system including a fuel valve and a throttle valve, the fuel valve being arranged to control fuel provision into the mixture and the throttle valve being adjustable to control the provision of air into the mixture;
   a throttle position sensor configured to determine a position of the throttle valve within a full range of operation of the throttle valve;
   a speed sensor configured to determine engine speed; and
   a controller configured to control the operation of the fuel valve and the spark plug, the controller being configured to receive an indication of the engine speed from the speed sensor and detect a position of the throttle valve,
   wherein the internal combustion engine is configured to be started in either a start-up mode or a normal mode,
   wherein in the start-up mode, the controller is configured to initiate a speed limitation operation,
   wherein in the normal mode, the controller does not initiate the speed limitation operation,
   wherein the internal combustion engine is initially started in the start-up mode unless the throttle valve is moved a predetermined amount within the full range of operation of the throttle valve, either in an opening or closing direction of the throttle valve, from an initial position of the throttle valve thereby indicating an intentional movement of a throttle of the power tool, and
   wherein the speed limitation operation of the start-up mode is maintained until the throttle valve is moved the predetermined amount.

2. The internal combustion engine of claim 1, wherein the predetermined amount is three to thirty percent of the full range of operation of the throttle valve from the initial position of the throttle valve.

3. The internal combustion engine of claim 1, wherein the predetermined amount is three to twelve percent of the full range of operation of the throttle valve from the initial position of the throttle valve.

4. The internal combustion engine of claim 1, wherein the predetermined speed of the speed limitation operation is a clutch-in speed of the engine at which the clutch engages the working assembly.

5. The internal combustion engine of claim 1, wherein the speed limitation operation includes skipping application of sparks.

6. The internal combustion engine of claim 1, wherein the controller is configured to skip a number of sparks based on a difference between current revolution speed and a threshold value of the engine speed, so that an increase in revolution speed leads to an increase in number of sparks skipped.

7. The internal combustion engine of claim 1, wherein the controller is configured to limit revolution speed by adapting timing of the ignition.

8. The internal combustion engine of claim 1, wherein the engine is provided in a chainsaw, power cutters, a pole saw, a brush cutter, a hedge trimmer or a trimmer.

9. A power tool comprising:
   a working assembly configured to perform a cutting operation;
   a clutch for driving the working assembly; and
   an internal combustion engine for driving the working assembly with the clutch, the internal combustion engine comprising:
      a combustion chamber into which a mixture of fuel and air is supplied;
      a spark plug disposed proximate to the combustion chamber to ignite the mixture by generating a spark, ignition of the mixture driving a piston operably coupled to a crank portion of the engine;
      a fuel supply system including a fuel valve and a throttle valve, the fuel valve being configured to control fuel provision into the mixture and the throttle valve being adjustable to control the provision of air into the mixture;
      a throttle position sensor configured to detect a throttle position of the throttle valve within a full range of operation of the throttle valve;
      a speed sensor configured to determine engine speed; and
      a controller configured to control the operation of the fuel valve and the spark plug, the controller being configured to receive an indication of the engine speed from the speed sensor and to determine whether the engine speed exceeds a threshold value, and, if so, initiate a speed limitation operation maintaining the engine speed below a predetermined speed,
   wherein said controller is further configured to detect that the throttle valve is moved a predetermined angular value from an initial position of the throttle valve, either in an opening or closing direction of the throttle valve thereby indicating an intentional movement of a throttle of the power tool, and in response to detecting that the throttle valve is moved the predetermined angular value, the controller is further configured to discontinue the speed limitation operation.

10. A method of controlling an internal combustion engine of a power tool, the internal combustion engine including a throttle valve, the method comprising:
   determining an initial position of the throttle valve within a full range of operation of the throttle valve at start-up of the engine;
   determining whether the engine should be started in a start-up mode or a normal mode, wherein starting the engine in the start-up mode comprises initiating a speed limitation operation at the start-up of the engine, the speed limitation operation maintaining an engine speed below a predetermined level and, wherein starting the engine in the normal mode comprises no initiation of the speed limitation operation at the start-up of the engine;
   starting the engine in the start-up mode unless the throttle valve is moved a predetermined amount within the full range of operation of the throttle valve, either in an opening or closing direction of the throttle valve, from an initial position of the throttle valve thereby indicating an intentional movement of a throttle of the power tool; and maintaining the speed limitation operation of the start-up mode until the throttle valve is moved the predetermined amount.

11. An engine control arrangement for an internal combustion engine, comprising:
- a throttle position sensor configured to determine an angular position of a throttle valve of the engine and produce throttle position data, the throttle position sensor being an analog magnetic flux sensor; and
- a controller configured to operate in one of a normal mode and a start-up mode dependent upon the throttle position data,
- wherein the normal mode includes controlling a fuel supply dependent upon the throttle position data,
- wherein the start-up mode includes initiating a speed limitation mode that maintains the engine speed below a predetermined speed, and
- wherein the controller is further configured to detect that the throttle valve is moved a first predetermined angular value by more than an angular threshold, either in an opening or closing direction of the throttle valve thereby indicating an intentional movement of a throttle of the power tool, and in response to detecting that the throttle valve is moved the first predetermined angular value by more than the angular threshold, the controller is further configured to begin operating in the normal mode.

12. The engine control arrangement of claim 11, where the predetermined speed of the speed limitation operation is a clutch-in speed of the engine at which a clutch of the engine engages a corresponding working assembly.

13. The engine control arrangement of claim 11, wherein the controller comprises a first control unit configured to operate in one of the normal mode and the start-up mode dependent upon the throttle position data and a second control unit that is configured to receive the throttle position data and send a signal to the first control unit regarding operation in either the normal mode or the start-up mode.

14. The method of claim 10 further comprising discontinuing the speed limitation operation in response to detecting that the throttle valve is moved outside the predetermined amount.

* * * * *